United States Patent [19]

Shoup, II

[11] Patent Number: 4,654,805

[45] Date of Patent: Mar. 31, 1987

[54] COMPUTER ASSISTED DESIGN AND ELECTROMECHANICAL OPERATING SYSTEM

[75] Inventor: Walter C. Shoup, II, Wyckoff, N.J.

[73] Assignee: Autographic Business Forms, Inc., Mahwah, N.J.

[21] Appl. No.: 730,936

[22] Filed: May 6, 1985

[51] Int. Cl.$^4$ .............................................. G06F 15/60
[52] U.S. Cl. .................................... 364/520; 364/900; 364/167
[58] Field of Search ............... 364/520, 513, 518, 167, 364/900; 318/567, 569, 571; 346/29, 30, 51

[56] References Cited

U.S. PATENT DOCUMENTS

| | | | |
|---|---|---|---|
| 4,419,740 | 12/1983 | Hevenor, Jr. | 364/900 |
| 4,541,060 | 9/1985 | Kogawa | 364/513 |

OTHER PUBLICATIONS

Fisk, "Control for Digital Plotter", Jul. 1970, IBM Technical Disclosure Bulletin, pp. 458–459.

*Primary Examiner*—Errol A. Krass
*Assistant Examiner*—Thomas G. Black
*Attorney, Agent, or Firm*—Hopgood, Calimafde, Kalil, Blaustein & Judlowe

[57] ABSTRACT

A micro-computer is coupled to the X-Y coordinate drives of a plotting table or the like and it is programmed to provide for monitor displayed pattern design. Straight or circular lines are subdivided into a number of unit steps based upon the system resolution such that each unit step segment of a straight line and each unit step chord of a circular line corresponds to said system resolution. The sine and cosine functions of the slopes of said segments or chords are summed, and the X and Y coordinate drives are advanced one unit step each time the cosine and sine functions, respectively, crosses an integer boundary.

12 Claims, 9 Drawing Figures

COMPUTER ASSISTED DESIGN AND ELECTROMECHANICAL OPERATING SYSTEM

BACKGROUND OF THE INVENTION

The present invention relates to two-dimensional design and machine control systems and, more particularly, to those systems generally designated with the acronym CAD/CAM.

Computer aided design has been available for some time, so has computer aided machining, and the two have previously been used in combination. However, the hardware involved has usually included mini-computers or mainframe computers, or has suffered from problems of control accuracy. Such systems have relied upon costly hardware and have generally been out of reach of the smaller designer or manufacturer.

As a result of studying the systems presently available, it was discovered that the art lacked a versatile and efficient method for utilizing existing computer design programs and translating the data produced by such programs into a machine control language that was convenient to use and readily adaptable to a wide range of X-Y coordinate controllable mechanisms.

Therefore, it is an object of the present invention to provide a relatively low cost system enabling an operator to design two-dimensional parts directly on a computer of the type presently referred to as a "personal computer" or by the abbreviation "PC".

It is a further object of the present invention to provide a method of using such computer assisted designs to operate automatically the X-Y coordinate drives associated with either a machine tool or a plotting table or the like.

SUMMARY OF THE INVENTION

In accordance with one aspect of the present invention there is provided the method of using a CAD representation of a two-dimensional pattern to replicate the pattern in the displacement of an X-Y coordinate displaceable mechanism having separate drives for each of the X-Y components of displacement, wherein a first computer-readable data file contains parameterization statements of the two-dimensional pattern, defining straight-line elements by cartesian definition of the element end points relative to a specifiable origin, and defining circular-line elements by polar coordinate definition of the starting and terminating angular positions of the defining vector, the radius of the vector, and the cartesian coordinate location of the center of curvature relative to said origin, which method comprises:

(a) computing the length of each of said elements and the respective quotient of each length divided by the resolution of said displaceable mechanism to provide a number of unit steps for each element;

(b) determining the magnitude of the sine and cosine functions of the slope of each straight-line element;

(c) establishing a computation loop to accumulate iteratively the sum of the sine function magnitude and separately similarly accumulate the sum of the cosine function magnitude for a number of iterations equal to said number of unit steps for the respective straight-line element;

(d) determining for circular-line elements the value of a unit angle in radians by dividing the angle of arc from the starting to the terminating angular positions of the defining vector by the corresponding computed number of unit steps for the element;

(e) establishing a computation loop to determine iteratively the magnitude of the sine and cosine functions of the slope of each chord subtended by successive adjacent unit angles over the entire length of each circular-line element, and accumulating the sum of the chord-slope sine function magnitude and separately similarly accumulating the sum of the chord-slope cosine function magnitude for a number of iterations equal to said number of unit steps for the respective circular-line element;

(f) providing a mechanism X-coordinate drive stepping impulse each time the accumulated cosine values obtained in each of steps (c) and (e) crosses an integer boundary;

(g) providing a mechanism Y-coordinate drive stepping impulse each time the accumulated sine values obtained in each of steps (c) and (e) crosses an integer boundary; and (h) simultaneously applying said stepping impulses to the respective X-Y coordinate drives.

In accordance with a further aspect of the present invention there is provided apparatus for computer assisted design and control of an X-Y coordinate displaceable mechanism comprising in combination a first computer-readable data file for holding parameterization statements of a two-dimensional pattern that defines straight-line elements by cartesian definition of the element end points relative to a specifiable origin, and defines circular-line elements by polar coordinate definition of the starting and terminating angular positions of the defining vector, the radius of the vector, and the cartesian coordinate location of the center of curvature relative to said origin; means for computing the length of each of said elements and the respective quotient of each length divided by the resolution of said displaceable mechanism to provide a number of unit steps for each element; means for determining the magnitude of the sine and cosine functions of the slope of each straight-line element; means for establishing a computation loop to accumulate iteratively the sum of the sine function magnitude and separately similarly accumulate the sum of the cosine function magnitude for a number of iterations equal to said number of unit steps for the respective straight-line element; means for determining for circular-line elements the value of a unit angle in radians by dividing the angle of arc from the starting to the terminating angular position of the defining vector by the corresponding computed number of unit steps for the element; means for establishing a computation loop to determine iteratively the magnitude of the sine and cosine functions of the slope of each chord subtended by successive adjacent unit angles over the entire length of each circular-line element, and accumulating the sum of the chord-slope sine function magnitude and separately similarly accumulating the sum of the chord-slope cosine function magnitude for a number of iterations equal to said number of unit steps for the respective circular-line element; means providing a mechanism X-coordinate drive stepping impulse each time the accumulated cosine values obtained by each of said loop establishing means crosses an integer boundary; means providing a mechanism Y-coordinate drive stepping impulse each time the accumulated sine values obtained by each of said loop establishing means crosses an integer boundary; and means for applying said stepping impulses simultaneously to the respective drives of said mechanism.

BRIEF DESCRIPTION OF THE DRAWINGS

The invention will be better understood after reading the following detailed description of the presently preferred embodiment thereof with reference to the appended drawings in which.

The same reference numerals are used throughout the drawings to designate the same or similar parts.

DETAILED DESCRIPTION OF THE PRESENTLY PREFERRED EMBODIMENT

Figures 1, 2:
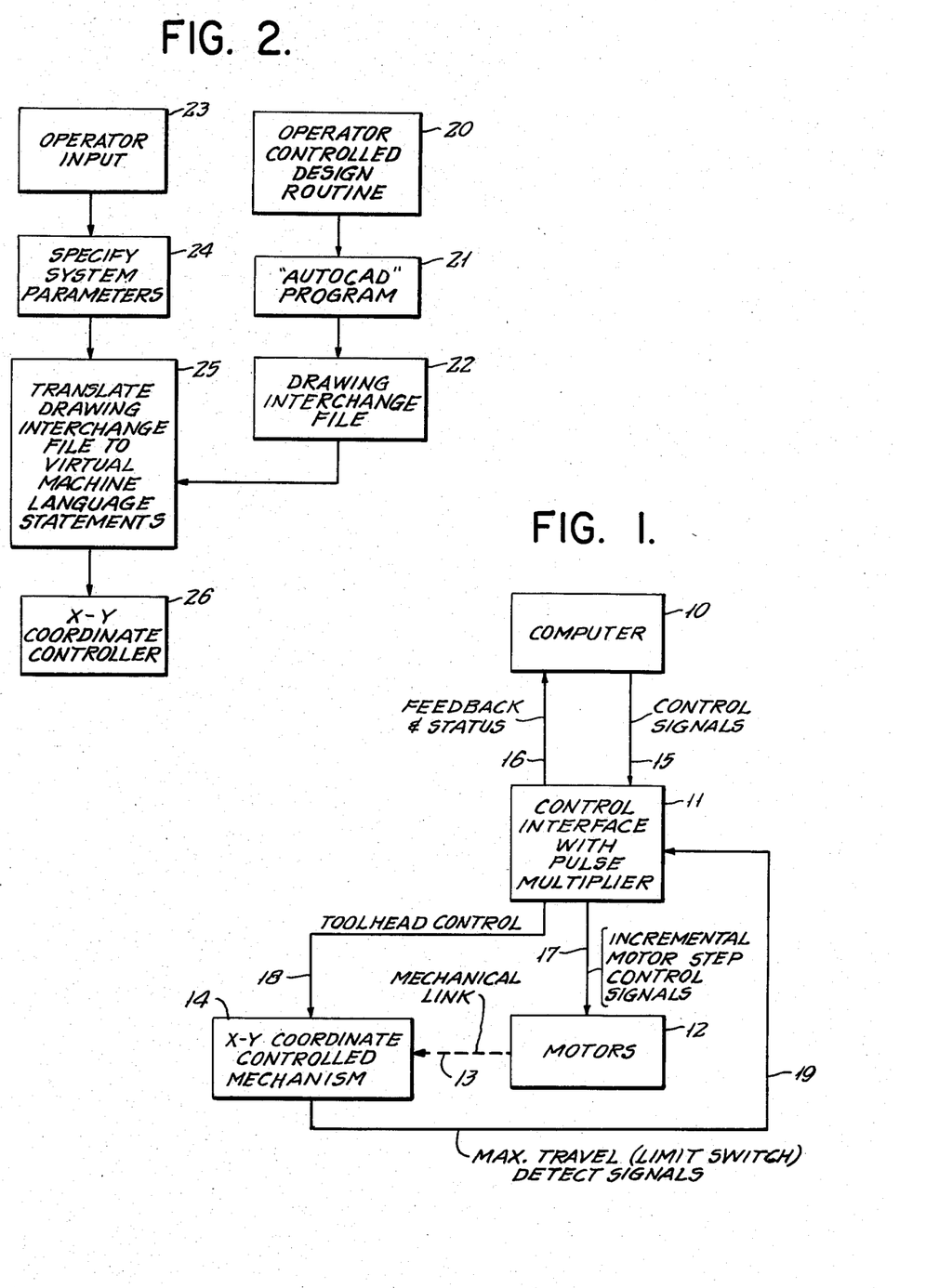
FIG. 1 is a block diagram showing the principal components of the entire control system.
FIG. 2 is a block diagram by way of a flow chart representation of the operation of the system of FIG. 1.

Referring now to FIG. 1 of the drawings, the basic components of the present system are shown as consisting of a computer 10 connected through a control interface 11 with the motors 12 that drive through a mechanical link 13 the X-Y coordinate members of the X-Y coordinate controlled mechanism 14. Control signals are fed over a path 15 from the computer 10 to the control interface 11 which, in turn, feeds back feedback and status information over a return path 16 to the computer 10. The control interface 11 has two output paths, one over path 17 to provide motor step control signals to the motors 12 and another output over path 18 to a toolhead of the mechanism 14 for controlling the same. The mechanism 14 is provided with limit switches (not shown) for sensing the usual travel end limits and for providing signals over a path 19 back to the control interface 11.

The mechanism 14 may take the form of any cartesian coordinate controllable device such as a machine tool or plotting board, having numerically controlled motor drives for the respective coordinates. When mention is made throughout this specification of an output pulse from the control system to the motors 12, it is to be understood that such pulse may not literally be a single electrical pulse but may consist of a series of pulses or a signal in any other form capable of producing the smallest movement within the motors of which the assembly is capable. Considering the combination of the motors and the mechanism controlled thereby, the amount of linear movement appearing in the mechanism in response to the minimum input signal to the motors will be referred to as the resolution of the system and, for convenience, will be referred to as the single pulse resolution. Hereinafter, such resolution may be referred to by the symbol "i".

The computer utilized in the system of FIG. 1 is of the class known as a personal computer or PC. An embodiment of the present invention has been produced employing an "IBM PC/XT" personal computer.

For the purpose of providing the two-dimensional design function, the present invention makes use of a computer aided design program marketed under the trademark "AutoCAD" by AutoDesk, Inc., located it 2320 Marinship Way, Sausalito, California 94965. The "AutoCad" program is a sophisticated CAD program that permits creation of two-dimensional designs on a computer screen storing the necessary data in appropriate files. Although such program contains a windowing feature, it is not used in the present system. Instead, the present system has its own programmed windowing feature permitting the operator to break up a large job into smaller pieces that fit within the limits of the particular displaceable control mechanism being used. For convenience of description, we shall refer hereinafter to a plotting table as the mechanism in question. The plotting table, of course, will have definite specifiable dimensions. However, using the present system it is possible to plot a large design that exceeds the range of the particular plotting table. With the windowing feature, the plotting table can reproduce one section of the job at a time, with provision for repositioning the workpiece and continuing the plot until the job is completed. As will be explained hereinafter, the system places reference marks along the edges of the workpiece at the boundaries corresponding to the boundaries of each window. Such reference marks can be used to reposition the workpiece relative to index markings on the plotting table.

In addition, the basic "AutoCad" program provides for creating overlays. That is, the program provides for assigning layers. Such overlays can be used in a manner similar to transparencies. Alternatively, a layer can be assigned for cutting a workpiece while another is assigned for etching, or the like.

The AutoCAD system defines straight lines by cartesian definition of the element end points relative to a specifiable origin. The system defines circular-line elements by polar coordinate definition of the starting and terminating angular positions of the defining vector, expressed in radians, the radius of the vector, and the cartesian coordinate location of the center of the circle or center of curvature relative to said origin.

Referring to FIG. 2 of the drawings, it will be seen that the operator controlled design routine 20 is entered via the "AutoCAD" program 21, as previously explained. Once the particular two-dimensional design has been "drawn", the necessary data is stored in known manner in the computer's disk or other storage media in a format that is not easily accessible by other programs. Consequently, the "AutoCAD" program 21 includes provision for converting the recorded data from its own internal format to a more easily accessible format called a Drawing Interchange File (DXF). This is represented in FIG. 2 by the box 22. The present invention has added to the system, as shown in FIG. 2, the necessary hardware and software for translating the Drawing Interchange File, 22, to virtual machine language statements with means for operator input to specify system parameters related to the X-Y coordinate controller. These elements have been outlined in FIG. 2 by the boxes 23, 24, 25 and 26. The system parameters that are contemplated encompass plotting scale, window dimensions, plotting table dimensions, plotting resolution, plotting speed, and the like. It is at this point in the system that windowing is implemented using known techniques.

Table speed is usually entered in inches per second. Given a standard IBM XT computer, and a system resolution of 0.001 inch, the table speed should be limited to 1.6 inches per second, although speeds of up to 2 inches per second may be obtainable. If the speed is set too high for the operating speed of the particular computer, pauses in table movement will occur. The maximum speed is directly proportional to the table resolution, doubling the resolution doubles the allowable speed. The present system is not limited to a table resolution of 0.001 inch but may be used with resolutions as small as 0.0001 inch or better. The actual resolution will be determined by the realities of the mechanism employed.

Figure 3:
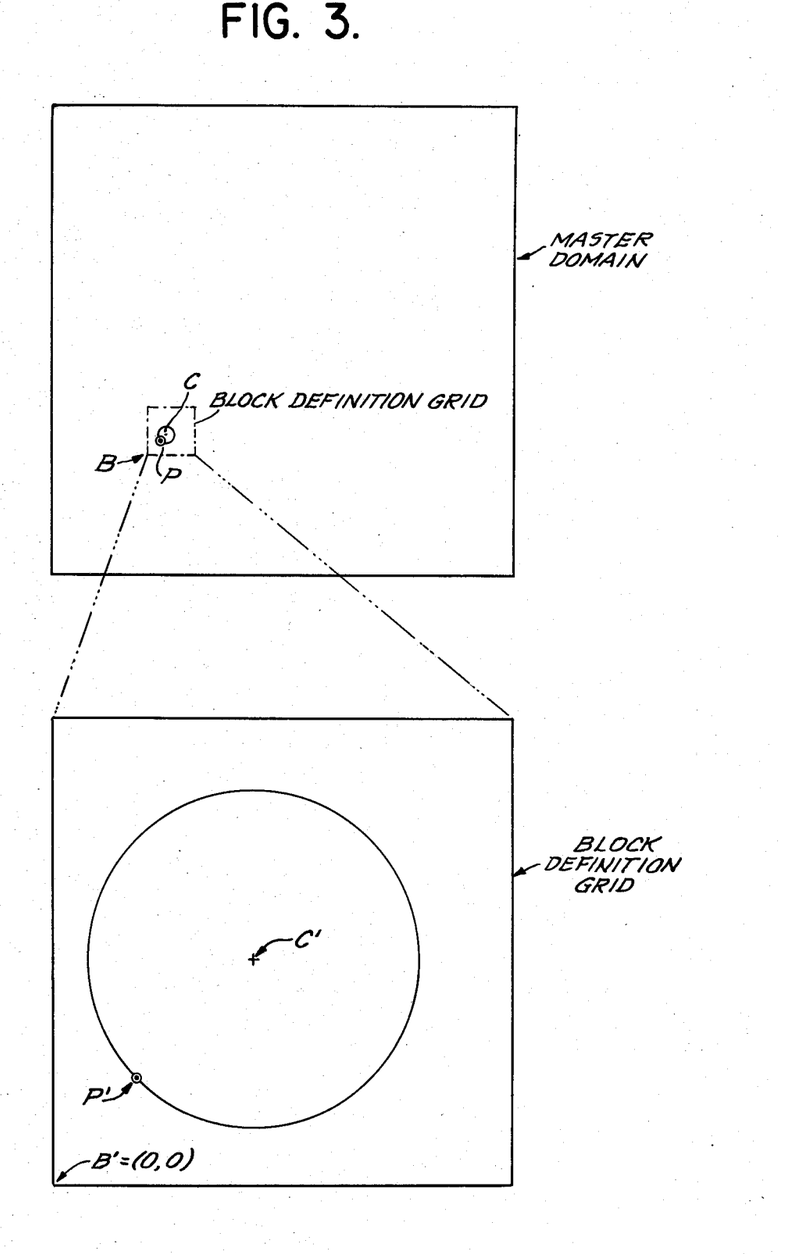
FIG. 3 is a schematic illustration useful in explaining the coordinate transformations employed within the system of FIG. 1.

In the process of translating from the Drawing Interchange File to the virtual machine language statements, the present system makes use of certain mathematical methods that reduce the number of individual computations required and speed up the overall operation of the equipment. In order to describe the methods employed it is helpful to understand the various domains in which the plotting takes place. Referring to FIG. 3 there is illustrated the process employed by the AutoCAD program. If the block definition grid denotes a local coordinate system within which a curve is defined, and the master domain denotes the universe of which the block definition grid is a sub-domain, we can define points that correspond in the two domains. Thus, P' represents a point in the block definition grid while P represents the point in the master domain corresponding to P'. Let B'=(0,0) be the origin of the block definition grid and let B be the point in the master domain which corresponds to P'. Also, as shown in FIG. 3, with the exemplary curve being a circle, its center is represented by C' in the block definition grid and by a corresponding C in the master domain. Although not shown, another domain corresponding to the plotting table or the like is referred to as the "mapped master domain". We let "I" be an arbitrary point in the mapped master domain and let all points in the block definition grid be mapped onto I.

A series of four transformations are now available involving translation from the master domain to the block definition grid, scaling of the X and Y coordinates within the block definition grid by arbitrary, real scale factors, rotation about B' by any selectable angle, and mapping of the points in the block definition grid onto the mapped master domain at I.

Plotting tables or other X-Y coordinate displaceable mechanisms can be commanded to move in distance increments along the X axis and the Y axis. The unit distance of motion is called, as previously mentioned, the resolution (i). The mechanical drive train and the type of motor used determines the maximum speed of said motion. The present system generates pulses for the motors which cause the table or mechanism to trace a given curve in steps of the table resolution at a given mechanism speed. If the speed of the device movement is represented by s, the time (t) during which the computer must generate the pulses for the next unit table movement is given by the expression t=i/s. If the computer cannot generate pulses for unit moves within the time, t, then the system cannot operate at speed, s. However, it is assumed that t is within the limits imposed by the cycle time of the computer.

Figure 4:
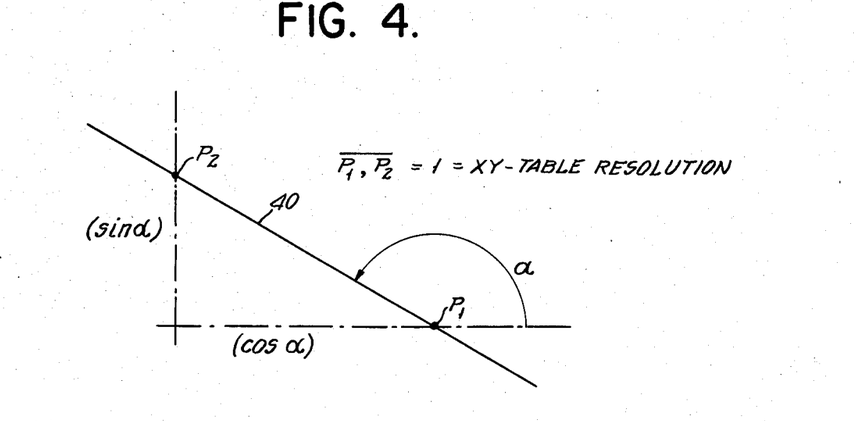
FIG. 4 is a diagram useful as an aid to explaining the arithmetic involved in handling straight-line elements.

Referring to FIG. 4, consider the straight-line element 40 extending between end points $P_1$ and $P_2$. Let $P_1$ and $P_2$ be defined such that $|P_2-P_1|=1$. It should be apparent from FIG. 4 that the difference in the X-components $[P_2(X)-P_1(X)]$ is identical to the cosine of the angle $\alpha$ subtended by the line segment 40 and the local horizontal at $P_1$ measured in the counterclockwise direction from the conventional zero angle position. Similarly, the difference between the Y-components of $P_2$ and $P_1$ is the sine of the aforesaid angle. The cosine of the angle $\alpha$ represents the fractional X-motor pulse required to move from $P_1$ to $P_2$ while the sine of the angle is the fractional Y-motor pulse required for such move.

Figure 5:
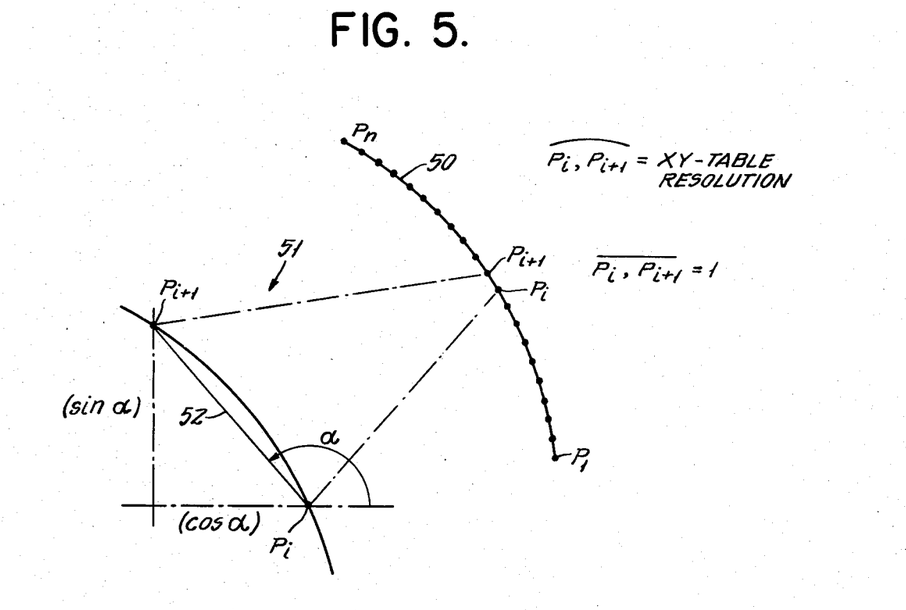
FIG. 5 is a diagram similar to FIG. 4 for aiding in explanation of the arithmetic used in operating on circular-line elements.

Reference should now be had to FIG. 5 of the drawings. As shown therein the circular arc 50 represents the locus of the points, $P_i$, where the chordal distance between points $P_i$ and $P_{i+1}$ is equal to 1. The arc and chord between points $P_i$ and $P_{i+1}$ have been drawn to an enlarged scale at 51 such that the relationships can be compared readily with that of the straight line in FIG. 4 from which it will be observed that if the length of the chord 52 in FIG. 5 is made equal to 1, the X and Y coordinate components of the vector that defines chord 52 are represented by $\cos\alpha$ and $\sin\alpha$ where $\alpha$ is the angular rotation of the chord or vector 52 from the horizontal about point $P_i$.

Since the X-Y coordinate controller can only move in units of whole (integer) steps, it is necessary to determine the points at which whole steps should be taken such that the error between the curve traced by the displaceable mechanism and the ideal curve represented by the locus of points, $P_i$, is minimized in a least-squares sense. For this purpose the present invention utilizes an algorithm encompassing the following steps:

1. Compute the direction cosines (unit vector components) at each point, $P_i$.

2. Accumulate the sum of $\cos\alpha$ and $\sin\alpha$.

3. Take an X-motor step when the cosine sum crosses an integer boundary.

4. Take a Y-motor step when the sine sum crosses an integer boundary.

Figure 6:
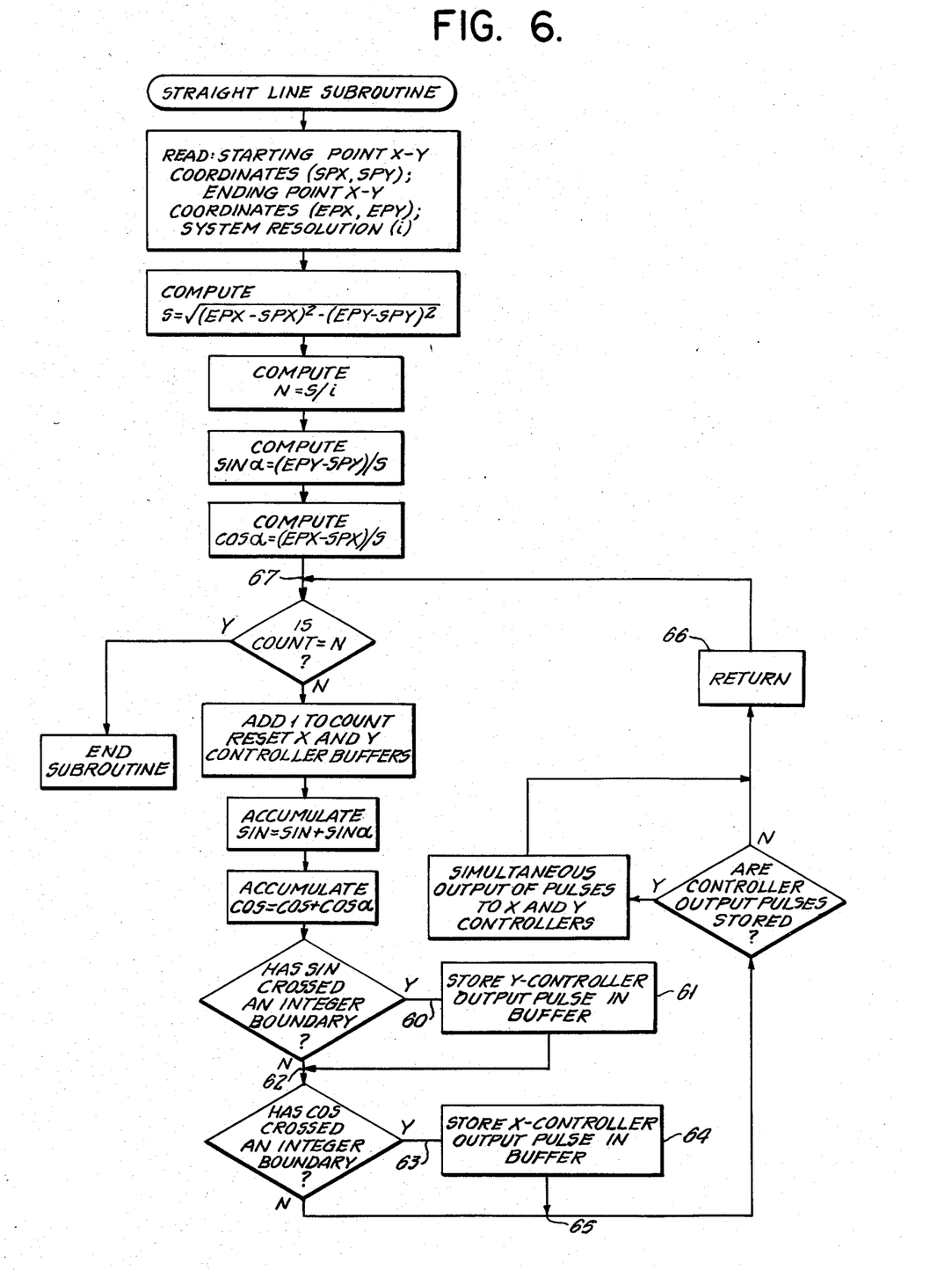
FIG. 6 is a flow chart indicating the subroutine program employed to handle straight-line elements.
Figure 7:
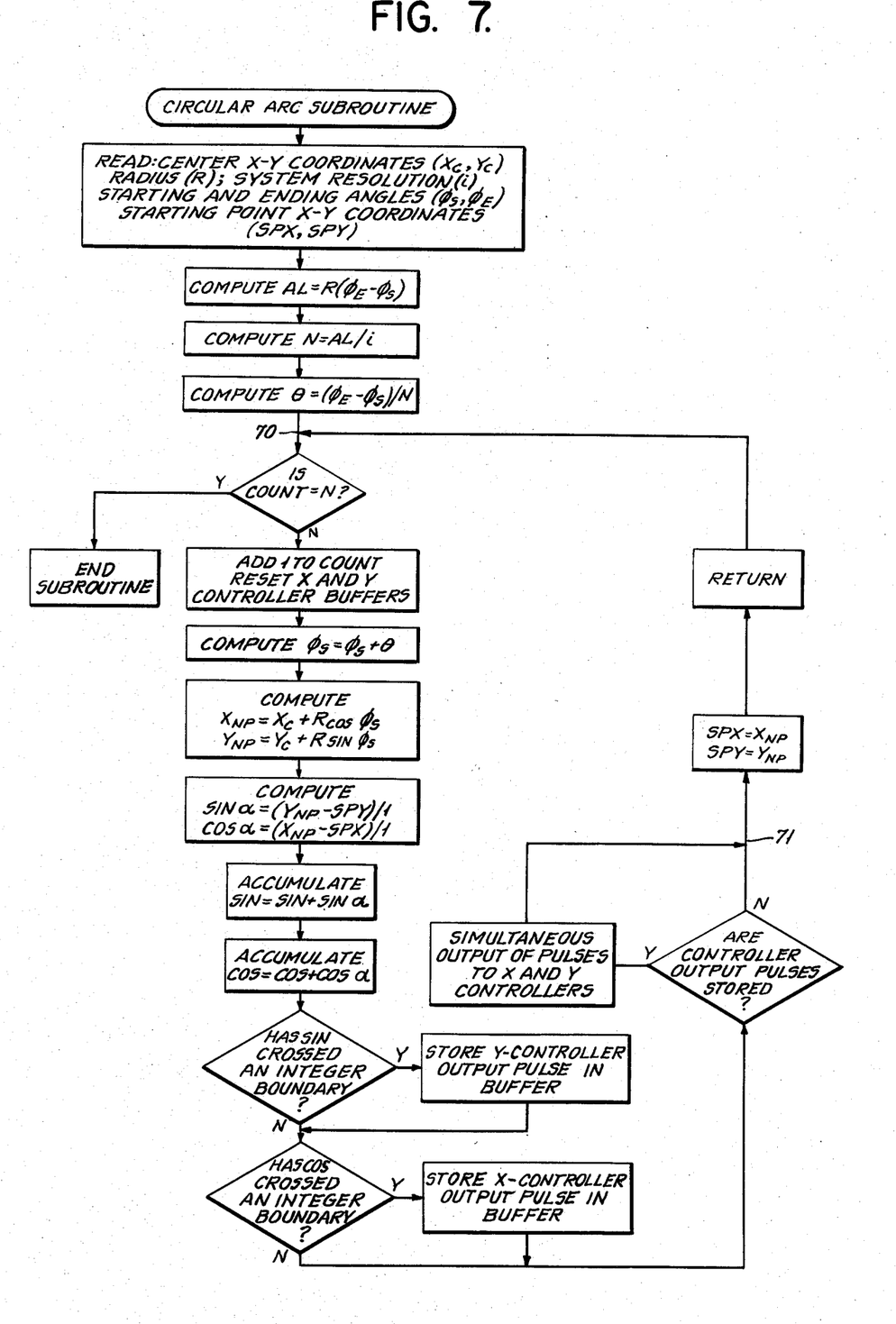
FIG. 7 is a flow chart illustrative of the subroutine employed in handling circular arcs.

The actual computer subroutine that is employed to accomplish the required computation is illustrated for a straight line in FIG. 6 and for a circular arc in FIG. 7. Referring to FIG. 6, the subroutine commences with a series of read statements, obtaining the cartesian coordinate definition of the starting point of the curve to be traced, the coordinates being called SPX and SPY for the X and Y coordinates, respectively; the coordinates EPX and EPY defining the ending point; and the system resolution i.

Next, using the pythagorean theorem the length, S, of the line between the starting and ending points is calculated; then by using the formula N=S/i, the system computes the number of unit steps, i.e., system resolution length steps, that are required to traverse the length of the line, S. Next, the sine and cosine functions are computed using the standard trigonometric relationships:

$$\sin\alpha=(EPY-SPY)/S$$

$$\cos\alpha=(EPX-SPX)/S$$

Starting with zero count, a loop is entered to take a series of iterative program steps equal to the number, N, previously computed. As shown by the flow chart of FIG. 6, the loop is entered through a computer decision step as to whether or not the count has reached N. When it does, the subroutine is ended. However, until the count reaches N the routine proceeds first to the step of adding 1 to the existing count and resetting to logic 0 the X and Y controller buffers, and then to the steps of summing sin$\alpha$ and cos$\alpha$ in respective accumulators or registers. The sin sum is then tested to determine whether the value has crossed an integer boundary. If the answer is affirmative, an output is applied over path 60 to a buffer 61 to store a Y-controller output pulse. Then the program resumes at junction 62 with testing to determine whether the value of the cos sum has crossed an integer boundary. If the sin sum test is negative, the program immediately advances through point 62 to the cos test.

Similarly, if the result of the cos test is affirmative, an output is applied over path 63 to a buffer 64 to store an X-controller output pulse. Then the program resumes at junction 65. Alternatively, if the cos sum test is negative, the program immediately advances to point 65. Here a decision is reached as to whether or not controller output pulses have been stored in buffers 61 and 64. If they have, such pulses are output simultaneously to the X and Y controllers and the program then steps through the return 66 back to the loop entrance at 67. However, if neither the sin or cos has crossed an integer boundary, there is a direct stepping from point 65 through return 66 back to loop entry 67.

Referring now to FIG. 7, it will be seen that the subroutine employed to handle circular arcs is dealt with in a manner quite similar to that just discussed with reference to FIG. 6. First, all of the necessary data is read such as the X-Y coordinates ($X_c$, $Y_c$) of the center of the arc or circle; the radius (R); the system resolution (i); the starting and ending angles ($\phi_s$, $\phi_e$); and the starting point X-Y coordinates (SPX, SPY). Then the routine proceeds to compute the arc length, AL, using the equation AL=R($\phi_e - \phi_s$). Next there is computed the value of N using the relationship N=AL/i. It is then necessary to compute the value of the unit angle $\theta$ using the equation $\theta = (\phi_e - \phi_s)/N$.

Now a loop is entered at 70 which is traversed for a number of iterations equal to the number N. Assuming that prior to entering the loop the count has been reset to zero, the program first steps through the machine decision and then on to adding one to the count and resetting to logic 0 the X and Y controller buffers. Thereafter, a new starting angle is computed by adding the computed value of $\theta$ which remains a constant throughout the entire loop sequence. This is represented by $\phi_s = \phi_s + \theta$. Next, the computer calculates the X and Y coordinates, $X_{NP}$ and $Y_{NP}$ of the next point along the circular arc being plotted, a resolution distance away. The formulas employed are:

$$X_{NP} = X_c + R \cos \phi_s$$

$$Y_{NP} = Y_c + R \sin \phi_s.$$

Then utilizing the new points the system calculates sin$\alpha$ and cos$\alpha$ using the expressions:

$$\sin \alpha = (Y_{NP} - SPY)/1$$

$$\cos \alpha = (X_{NP} - SPX)/1$$

Thereafter, the sin and cos functions are separately accumulated and separately tested by machine decision steps to determine whether or not the respective function has crossed an integer boundary. The operation at this point in the program is essentially identical to that described with reference to FIG. 6 until point 71 on the flow chart of FIG. 7. Here the system sets the points SPX and SPY, respectively, to the last determined $X_{NP}$ and $Y_{NP}$ and then returns to the beginning of the loop at 70.

Figure 8:
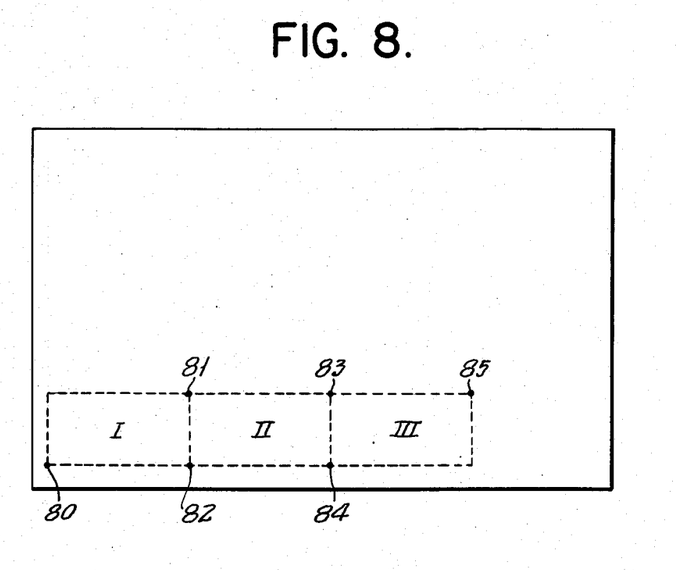
FIG. 8 is a diagrammatic illustration of the screen display of the apparatus of FIG. 1 useful as an aid to explaining the windowing function provided by the system.

Now referring to FIG. 8, there is illustrated schematically an exemplary screen presentation wherein a large pattern is subdivided by three windows into areas I, II and III. The instant program relies upon specification of the coordinates of the ends of the diagonal to define the rectangular window. Thus, the three windows are defined, respectively, by the coordinate pairs of the points (80, 81) (82, 83) and (84, 85). Then by providing for specification of the scaling factor between the screen representation and the actual displaceable mechanism, the window size can be correllated to the range of the mechanism.

Figure 9:
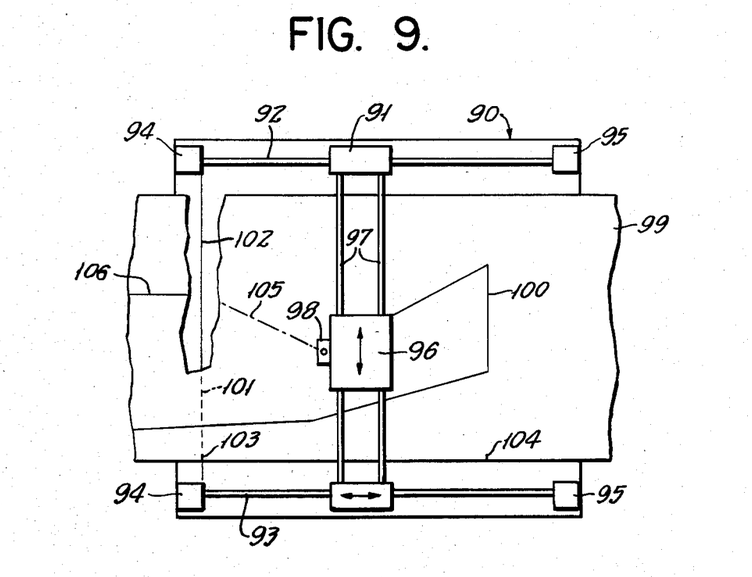
FIG. 9 is a schematic illustration of an X-Y plotting table with reference indicia for use in conjunction with the windowing function illustrated in FIG. 8.

Referring to FIG. 9, there is illustrated quite diagrammatically the essential elements of a plotting table 90, having a gantry 91 riding along the X axis on side rails 92 and 93 between end stops 94 and 95, and a carriage 96 that rides on rails 97 along the gantry 91 to define the Y axis. The carriage 96 carries the scriber or plotting instrument in a toolhead 98.

For purpose of illustration, an elongated workpiece 99, longer than the X dimension of the table 90, is in the process of having a long pattern 100 drawn thereon. The portion of the pattern 100 to the left of the broken line 101, as viewed in the drawing, was drawn from a prior "window". The table 90 has a transverse index line 102 located at the position of the toolhead 98 when gantry 91 is against or in the vicinity of end stops 94. Since limit switches (not shown) must be provided to define the travel limits of the gantry, the gantry may not be physically in contact with a rigid stop when the toolhead is over the index line. A reference mark 103, previously applied at one edge of workpiece 99, is shown aligned over index line 102. Another reference mark, 104, has already been applied at the righthand limit of gantry travel.

Upon completion of the trace drawing procedure, the toolhead will have traversed the path 105 to merge into the line 106 from the prior trace. When the window area has been traced, the workpiece is released and repositioned. Now the mark 104 is brought toward and over the index line 102 and the next window pattern is plotted. The right and left boundaries of each window correspond to the right and left limits of travel of the gantry 91.

The plotting table and system, described herein, has many uses. As an example, the table 90 can be used to lay out patterns on sail cloth for the purpose of marine sail construction. Obviously, other uses will occur to the reader.

Having described the presently preferred embodiment of the subject invention, it is to be understood that various changes in construction can be introduced, as will be apparent to those skilled in the subject art, without departing from the true spirit of the invention as defined in the appended claims.

What is claimed is:
1. The method of using a CAD representation of a two-dimensional pattern to replicate the pattern in the displacement of an X-Y coordinate displaceable mechanism having separate drives for each of the X-Y components of displacement, wherein a first computer-readable data file contains parameterization statements of the two-dimensional pattern, defining straight-line elements by cartesian definition of the element end points relative to a specifiable origin, and defining circular-line elements by polar coordinate definition of the starting and terminating angular positions of the defining vector, the radius of the vector, and the cartesian coordinate location of the center of curvature relative to said origin, which method comprises:

(a) computing the length of each of said elements and the respective quotient of each length divided by the resolution of said displaceable mechanism to provide a number of unit steps for each element;

(b) determining the magnitude of the sine and cosine functions of the slope of each straight-line element;

(c) establishing a computation loop to accumulate iteratively the sum of the sine function magnitude and separately similarly accumulate the sum of the cosine function magnitude for a number of iterations equal to said number of unit steps for the respective straight-line element;

(d) determining for circular-line elements the value of a unit angle in radians by dividing the angle of arc from the starting to the terminating angular position of the defining vector by the corresponding computed number of unit steps for the element;

(e) establishing a computation loop to determine iteratively the magnitude of the sine and cosine functions of the slope of each chord subtended by successive adjacent unit angles over the entire length of each circular-line element, and accumulating the sum of the chord-slope sine function magnitude and separately similarly accumulating the sum of the chord-slope cosine function magnitude for a number of iterations equal to said number of unit steps for the respective circular-line element;

(f) providing a mechanism X-coordinate drive stepping impulse each time the accumulated cosine values obtained in each of steps (c) and (e) crosses an integer boundary;

(g) providing a mechanism Y-coordinate drive stepping impulse each time the accumulated sine values obtained in each of steps (c) and (e) crosses an integer boundary; and (h) simultaneously applying said stepping impulses to the respective X-Y coordinate drives.

2. The method according to claim 1, wherein step (e) comprises during each traverse of said computation loop the steps in combination of determining the angle of a new vector advanced a unit angle distance from the vector defining the previous point, computing the cartesian coordinates of a new point defined by said new vector using said radius and the angle of said new vector, and determining said corresponding sine and cosine functions as equal to the respective differences between the X and Y coordinates of the new point and the like coordinates of the previous point.

3. The method according to claim 2, wherein all computations are performed by a micro-computer operating in floating point arithmetic.

4. The method according to claim 2, wherein said stepping impulses are passed through a pulse multiplier before being applied to said mechanism coordinate drives for increasing the corresponding operating speed of said drives, and the said resolution of said displaceable mechanism is altered in proportion to the pulse multiplication.

5. The method according to claim 2, comprising the further steps of windowing adjacent field segments of the total CAD representation with each window dimensioned in scaled proportion to the range of said displaceable mechanism, providing reference mark applying signals to a tool associated with said mechanism for marking a workpiece at the boundaries corresponding to the boundaries of each window for permitting reference mark controlled indexing of the workpiece to establish registration between adjacent fields.

6. The method according to claim 5, wherein said stepping impulses are passed through a pulse multiplier before being applied to said mechanism coordinate drives for increasing the corresponding operating speed of said drives, and the said resolution of said displaceable mechanism is altered in proportion to the pulse multiplication.

7. The method according to claim 1, wherein all computations are performed by a micro-computer operating in floating point arithmetic.

8. The method according to claim 1, comprising the further steps of windowing adjacent field segments of the total CAD representation with each window dimensioned in scaled proportion to the range of said displaceable mechanism, providing reference mark applying signals to a tool associated with said mechanism for marking a workpiece at the boundaries corresponding to the boundaries of each window for permitting reference mark controlled indexing of the workpiece to establish registration between adjacent fields.

9. The method according to claim 8, wherein said stepping impulses are passed through a pulse multiplier before being applied to said mechanism coordinate drives for increasing the corresponding operating speed of said drives, and the said resolution of said displaceable mechanism is altered in proportion to the pulse multiplication.

10. The method according to claim 1, wherein said stepping impulses are passed through a pulse multiplier before being applied to said mechanism coordinate drives for increasing the corresponding operating speed of said drives, and the said resolution of said displaceable mechanism is altered in proportion to the pulse multiplication.

11. The method according to claim 10, wherein all computations are performed by a micro-computer operating in floating point arithmetic.

12. Apparatus for computer assisted design and control of an X-Y coordinate displaceable mechanism comprising in combination a first computer-readable data file for holding parameterization statements of a two-dimensional pattern that defines straight-line elements by cartesian definition of the element end points relative to a specifiable origin, and defines circular-line elements by polar coordinate definition of the starting and terminating angular positions of the defining vector, the radius of the vector, and the cartesian coordinate location of the center of curvature relative to said origin; a computer for: (a) computing the length of each of said elements and the respective quotient of each length divided by the resolution of said displaceable mechanism to provide a number of unit steps for each element; (b) determining the magnitude of the sine and cosine functions of the slope of each straight-line element; (c) establishing a computation loop to accumulate iteratively the sum of the sine function magnitude and separately similarly accumulate the sum of the cosine function magnitude for a number of iterations equal to said number of unit steps for the respective straight-line element; (d) determining for circular-line elements the value of a unit angle in radians by dividing the angle of arc from the starting to the terminating angular position of the defining vector by the corresponding computed number of unit steps for the element; and (e) estaolishing a computation loop to determine iteratively the magnitude of the sine and cosine functions of the slope of each chord subtended by successive adjacent unit angles over the entire length of each circular-line element, and accumulating the sum of the chord-slope sine function magnitude and separately similarly accumulating the sum of the chord-slope cosine function magnitude for a number of iterations equal to said number of unit steps for the respective circular-line element; means providing a mechanism X-coordinate drive stepping impulse each time the accumulated cosine values obtained by each of said computation loops crosses an integer boundary; means providing a mechanism Y-coordinate drive stepping impulse each time the accumulated sine values obtained by each of said computation loops crosses an integer boundary; and means for applying said stepping impulses simultaneously to the respective drives of said mechanism.

* * * * *